(12) United States Patent
Ahmed et al.

(10) Patent No.: US 11,598,841 B1
(45) Date of Patent: Mar. 7, 2023

(54) SYSTEM AND METHOD FOR DISTRIBUTED DUAL-FUNCTION RADAR-COMMUNICATION

(71) Applicants: Temple University-Of The Commonwealth System of Higher Education, Philadelphia, PA (US); Government of the United States, as represented by the Secretary of the Air Force, Wright-Patterson AFB, OH (US)

(72) Inventors: Ammar Ahmed, Philadelphia, PA (US); Yimin Daniel Zhang, Berwyn, PA (US); Braham Himed, Beavercreek, OH (US)

(73) Assignees: Temple University—Of The Commonwealth System of Higher Education, Philadelphia, PA (US); Governemnt of the United States, as represented by the Secretary of the Air Force, Wright-Patterson AFB, OH (US)

( * ) Notice: Subject to any disclaimer, the term of this patent is extended or adjusted under 35 U.S.C. 154(b) by 188 days.

(21) Appl. No.: 16/854,251

(22) Filed: Apr. 21, 2020

(51) Int. Cl.
*G01S 7/00* (2006.01)
*G01S 13/00* (2006.01)

(52) U.S. Cl.
CPC ............ *G01S 7/006* (2013.01); *G01S 13/003* (2013.01)

(58) Field of Classification Search
None
See application file for complete search history.

(56) References Cited

U.S. PATENT DOCUMENTS

| 7,221,295 B2 * | 5/2007 | Carley ................... H03M 5/08 341/59 |
| 10,907,940 B1 * | 2/2021 | Parker ................... G06N 20/00 |
| 2007/0268182 A1 * | 11/2007 | Bourdelais ............ G01S 13/003 342/461 |

(Continued)

OTHER PUBLICATIONS

Shi, Chenguang et al. "A Robust Stackelberg Game-Based Power Allocation Scheme for Spectral Coexisting Multistatic Radar and Communication Systems." 2019 IEEE Radar Conference (RadarConf) (2019): 1-5. (Year: 2019).*

(Continued)

*Primary Examiner* — Timothy A Brainard
*Assistant Examiner* — Hailey R Le
(74) *Attorney, Agent, or Firm* — Riverside Law LLP

(57) ABSTRACT

A system for distributed dual-function radar-communication comprises a plurality of dual-function radar transmitters positioned within a region of interest, each configured to transmit at least one radar waveform, with each transmitter for having a minimum transmit power, a maximum transmit power, and a working transmit power, a plurality of radar receivers positioned within the region of interest, each configured to receive the radar waveforms, at least one controller communicatively connected to at least one connected transmitter of the plurality of dual-function radar transmitters, configured to calculate a vector of transmit power values for the plurality of dual-function radar transmitters. A method of transmitting a radar waveform is also disclosed.

19 Claims, 3 Drawing Sheets

(56) References Cited

U.S. PATENT DOCUMENTS

| | | | | |
|---|---|---|---|---|
| 2015/0036623 | A1* | 2/2015 | Maaref | H04W 72/082 |
| | | | | 370/329 |
| 2015/0222337 | A1* | 8/2015 | Mielczarek | H04B 7/066 |
| | | | | 375/267 |
| 2015/0338503 | A1* | 11/2015 | Stayton | G01S 7/003 |
| | | | | 342/36 |
| 2020/0041633 | A1* | 2/2020 | Torfs | G01S 5/18 |
| 2020/0153907 | A1* | 5/2020 | Davis | H04L 67/12 |
| 2021/0254961 | A1* | 8/2021 | Liu | G01B 11/2527 |

OTHER PUBLICATIONS

C. Shi, F. Wang, M. Sellathurai, J. Zhou and S. Salous, "Power Minimization-Based Robust OFDM Radar Waveform Design for Radar and Communication Systems in Coexistence," in IEEE Transactions on Signal Processing, vol. 66, No. 5, pp. 1316-1330, 1 Mar. 1, 2018, doi: 10.1109/TSP.2017.2770086. (Year: 2018).*

A. Ahmed, Y. D. Zhang, and B. Himed, "Multi-user dual-function radar-communications exploiting sidelobe control and waveform diversity," in Proc. IEEE Radar Conf., Oklahoma City, OK, Apr. 2018, pp. 698-702.

A. Ahmed, Y. D. Zhang, and Y. Gu, "Dual-function radar-communications using QAM-based sidelobe modulation," Digital Signal Process., vol. 82, pp. 166-174, Nov. 2018.

A. Ahmed, Y. Gu, D. Silage, and Y. D. Zhang, "Power-efficient multi-user dual-function radar-communications," in Proc. IEEE Int. Workshop on Signal Process. Advances in Wireless Commun., Kalamata, Greece, Jun. 2018.

A. Hassanien, M. G. Amin, Y. D. Zhang, and F. Ahmad, "Signaling strategies for dual-function radar-communications: An overview," IEEE Aerospace and Electronic Systems Magazine, vol. 31, No. 10, pp. 36-45, Oct. 2016.

A. Hassanien, M. G. Amin, Y. D. Zhang, and F. Ahmad, "Dual-function radar-communications using phase-rotational invariance," in Proc. European Signal Process. Conf., Aug. 2015, pp. 1346-1350.

A. Hassanien, M. G. Amin, Y. D. Zhang, and F. Ahmad, "Dual-function radar-communications: Information embedding using sidelobe control and waveform diversity," IEEE Trans. Signal Process., vol. 64, No. 8, pp. 2168-2181, Apr. 2016.

A. Hassanien, M. G. Amin, Y. D. Zhang, and F. Ahmad, "Phase-modulation based dual-function radar-communications," IET Radar Sonar Navig., vol. 10, No. 8, pp. 1411-1421, 2016.

A. Hassanien, M. G. Amin, Y. D. Zhang, F. Ahmad, and B. Himed, "Non-coherent PSK-based dual-function radar-communication systems," in Proc. IEEE Radar Conf., Philadelphia, PA, May 2016, pp. 1-6.

A. M. Haimovich, R. S. Blum, and L. J. Cimini, "MIMO radar with widely separated antennas," IEEE Signal Process. Mag., vol. 25, No. 1, pp. 116-129, 2008.

C. Baylis, M. Fellows, L. Cohen, and R. J. Marks, "Solving the spectrum crisis: Intelligent, reconfigurable microwave transmitter amplifiers for cognitive radar," IEEE Microw. Mag., vol. 15, No. 5, pp. 94-107, Jul.-Aug. 2014.

C. Sturm, T. Zwick, and W. Wiesbeck, "An OFDM system concept for joint radar and communications operations," in Proc. IEEE Veh. Technol. Conf., Barcelona, Spain, Apr. 2009, pp. 1-5.

D. W. Bliss, "Cooperative radar and communications signaling: The estimation and information theory odd couple," in Proc. IEEE Radar Conf., Cincinnati, OH, May 2014, pp. 50-55.

F. Liu, L. Zhou, C. Masouros, A. Li, W. Luo, and A. Petropulu, "Toward dual-functional radar-communication systems: Optimal waveform design," IEEE Trans. Signal Process., vol. 66, No. 16, pp. 4264-4279, Aug. 2018.

F. Paisana, N. Marchetti, and L. A. DaSilva, "Radar, TV and cellular bands: Which spectrum access techniques for which bands?" Commun. Surveys & Tuts., vol. 16, No. 3, pp. 1193-1220, 2014.

H. Godrich, A. M. Haimovich, and R. S. Blum, "Target localization accuracy gain in MIMO radar-based systems," IEEE Trans. Inf. Theory, vol. 56, No. 6, pp. 2783-2803, Jun. 2010.

H. Godrich, A. P. Petropulu, and H. V. Poor, "Power Allocation Strategies for Target Localization in Distributed Multiple-Radar Architectures," IEEE Transactions on Signal Processing, vol. 59, No. 7, pp. 3226-3240 Jul. 2011.

H. Godrich, A. P. Petropulu, and H. V. Poor, "Sensor selection in distributed multiple-radar architectures for localization: A knapsack problem formulation," IEEE Trans. Signal Process., vol. 60, No. 1, pp. 247-260, Jan. 2012.

H. Griffiths, L. Cohen, S. Watts, E. Mokole, C. Baker, M. Wicks, and S. Blunt, "Radar spectrum engineering and management: Technical and regulatory issues," Proc. IEEE, vol. 103, No. 1, pp. 85-102, Jan. 2015.

H. Griffiths, S. Blunt, L. Cohen, and L. Savy, "Challenge problems in spectrum engineering and waveform diversity," in Proc. IEEE Radar Conf., Ottawa, Canada, Apr.-May 2013, pp. 1-5.

H. T. Hayvaci and B. Tavli, "Spectrum sharing in radar and wireless communication systems: A review," in Proc. Int. Conf. Electromagn. in Advanced Appl., Palm Beach, Aruba, Aug. 2014, pp. 810-813.

J. Euziere, R. Guinvarc'h, M. Lesturgie, B. Uguen, and R. Gillard, "Dual function radar communication time-modulated array," in Proc. Int. Radar Conf., Cincinnati, OH, Oct. 2014, pp. 1-4.

K.-W. Huang, M. Bica, U. Mitra, and V. Koivunen, "Radar waveform design in spectrum sharing environment: Coexistence and cognition," in Proc. IEEE Radar Conf., Johannesburg, South Africa, May 2015, pp. 1698-1703.

S. D. Blunt, M. R. Cook, and J. Stiles, "Embedding information into radar emissions via waveform implementation," in Proc. Int. Waveform Diversity and Design Conf., Niagara Falls, Canada, Aug. 2010, pp. 195-199.

S. Kumar, G. Costa, S. Kant, B. F. Flemming, N. Marchetti, and P. Mogensen, "Spectrum sharing for next generation wireless communication networks," in Proc. Int. Workshop on Cognitive Radio and Advanced Spectr. Manag., Aalborg, Denmark, Feb. 2008, pp. 1-5.

Z. Geng, H. Deng, and B. Himed, "Adaptive radar beamforming for interference mitigation in radar-wireless spectrum sharing," IEEE Signal Process. Lett., vol. 22, No. 4, pp. 484-488, Apr. 2015.

* cited by examiner

SYSTEM AND METHOD FOR DISTRIBUTED DUAL-FUNCTION RADAR-COMMUNICATION

STATEMENT REGARDING FEDERALLY SPONSORED RESEARCH OR DEVELOPMENT

This invention was made with government support under contract no. FA8650-14-D-1722, awarded by the Air Force Research Laboratory. The government has certain rights in the invention.

BACKGROUND OF THE INVENTION

In the past decade, the issue of spectrum sharing has attracted significant attention due to the increasing congestion of spectral resources. Modern wireless communication systems demand the expansion of existing spectral allocations to improve the data rate. In addition, emerging technical innovations, like Internet-of-Things, require new frequency allocations. In this context, great efforts have been made in the field of cognitive radios to efficiently manage spectral utilization. Recently, coexistence of multiple applications within the same frequency band(s) has been proposed to mollify the spectral congestion by simultaneously sharing the same spectrum resources. Dual-function radar-communications (DFRC) is an important example of such a platform which may perform a secondary communication operation in addition to the primary radar function while utilizing the same frequency resources.

In DFRC systems, the transmitted waveform serves both radar and communication functions. The radar operation is considered to be the principal objective of the DFRC system whereas the communication operation is assumed to be the secondary objective. Recent DFRC techniques can be broadly classified into two main categories. The first category comprises waveform diversity-based methods which exploit a dictionary of waveforms capable of performing the radar operation. The communication operation is enabled by selecting the suitable waveform from the waveform dictionary. The second class employs beamforming-based spatial multiplexing techniques in addition to waveform diversity to achieve DFRC operation.

Multiple-input multiple-output (MIMO) radar systems with widely distributed antennas are known to offer improved localization capabilities due to enhanced spatial spread. The localization performance of distributed MIMO radars can further be improved by either increasing the number of participating radars or the transmitted energy. Many distributed MIMO radar systems designed to improve the localization accuracy focus on optimized resource allocation based on the Cramer-Rao bound (CRB) minimization or mutual information maximization. Resource-aware designs are very important for the deployment of sensor nodes in the network to reduce the operational cost. In order to enhance the performance of these systems, the participating radars are usually connected with ground stations, fusion centers, or in a distributed fashion using wireless links. Modern distributed systems need to perform the radar sensing as well as communication functions simultaneously while considering the onsite resource constraints. In this context, DFRC approaches have not been considered for the case of distributed MIMO architectures.

Thus, there is a need in the art for a novel resource-aware DFRC architecture for distributed MIMO systems configured to achieve high performance in both target localization and wireless communication. The present disclosure satisfies this need.

SUMMARY OF THE INVENTION

In one aspect, a system for distributed dual-function radar-communication comprises a plurality of M dual-function radar transmitters positioned within a region of interest, each configured to transmit at least one radar waveform, with each m-th transmitter for m=1, . . . , M having a minimum transmit power $p_{m_{tx,min}}$, a maximum transmit power $p_{m_{tx,max}}$, and a working transmit power $p_{m_{tx}}$, a plurality of radar receivers positioned within the region of interest, each configured to receive the radar waveforms, at least one controller communicatively connected to at least one connected transmitter of the plurality of dual-function radar transmitters, comprising a non-transitory computer-readable medium with instructions stored thereon, which when executed by a processor perform steps comprising accepting a vector of locations of the plurality of dual-function radar transmitters and a vector of locations of the radar receivers, accepting target data comprising a target location having a first target localization accuracy and an estimated radar cross section, calculating a vector of transmit power values $p_{tx}$ for the plurality of dual-function radar transmitters by minimizing $$\sum_{r=1}^{R}\left|V\left[\frac{p_{tx}}{X_r}\right]-\gamma_r\right|,$$

subject to $q-\eta A p_{tx} \leq 0$ and $X_r \geq 0$, wherein each transmit power value in the vector of transmit power values is between and $p_{m_{tx,min}}$ and $p_{m_{tx,max}}$ wherein the sum of the transmit power values in the vector of transmit power values is less than or equal to a maximum total transmit power for the system, and setting a transmit power of the at least one connected dual-function radar transmitter from the calculated vector.

In one embodiment, the at least one controller is communicatively connected to all of the dual-function radar transmitters. In one embodiment, the steps further comprise receiving an updated target location having a second target localization accuracy, and recalculating the vector of transmit powers. In one embodiment, the steps further comprise, when the target location is outside the region of interest, switching the system into a communication-only mode, and when the target location is inside the region of interest, switching the system into a dual-function radar-communication mode. In one embodiment, the system further comprises a time synchronization system communicatively connected to the dual-function radar transmitters and radar receivers, configured to synchronize clocks of the dual-function radar transmitters and radar receivers.

In one embodiment, the steps further comprise accepting a quantity of data to be transmitted, translating the quantity of data into a sequence of radar waveforms from a dictionary of radar waveforms, and providing the sequence of radar waveforms to the at least one connected dual-function radar transmitter. In one embodiment, the steps further comprise encrypting the binary data. In one embodiment, the steps further comprise adding error correction bits to the binary data. In one embodiment, the system further comprises a plurality of communication receivers. In one embodiment, the target data comprises a plurality of target locations, each having a target localization accuracy and an estimated radar cross section.

In another aspect, a method of transmitting a radar waveform comprises providing location data comprising a set of locations of a plurality of dual-function radar transmitters and a set of locations of a plurality of radar receivers, providing target data comprising a target location having a first target localization accuracy and an estimated radar cross section, providing a quantity of data for transmission and a dictionary of radar waveforms, calculating a vector of transmit power values $p_{tx}$ for the plurality of dual-function radar transmitters by minimizing $$\sum_{r=1}^{R}\left|V\left[\frac{p_{tx}}{X_r}\right]-\gamma_r\right|,$$

subject to $q-\eta A p_{tx} \leq 0$ and $X_r \geq 0$, setting a transmit power of at least one dual-function radar transmitter from a selected transmit power value in the vector of transmit power values, selecting a radar waveform from the dictionary of radar waveforms corresponding to a subset of the binary data, and transmitting the waveform from the at least one dual-function radar transmitter at the selected transmit power value, wherein each transmit power value in the vector of transmit power values is between $p_{tx,min}$ and $p_{tx,max}$ and wherein the sum of the transmit power values in the vector of transmit power values is less than or equal to a maximum total transmit power for the system.

In one embodiment, the method further comprises setting a transmit power of the plurality of dual-function radar transmitters from the transmit power values in the vector of transmit power values. In one embodiment, the method further comprises selecting a second radar waveform from the dictionary of radar waveforms corresponding to an adjacent subset of the binary data, and transmitting the second radar waveform from the at least one dual-function radar transmitter at the selected power value.

In one embodiment, the method further comprises receiving the waveform with at least one dual-function radar receiver of the plurality of radar receivers, calculating, from the received waveform, an updated target location having a second target localization accuracy, providing the updated target location and second target localization accuracy to the at least one dual-function radar transmitter, recalculating the vector of transmit power values, and setting a transmit power of the at least one dual-function radar transmitter from a selected transmit power value in the updated vector of transmit power values.

In one embodiment, the second target localization accuracy is more accurate than the first target localization accuracy. In one embodiment, the method further comprises switching the at least one dual-function radar transmitter to a radar-only mode, calculating a vector of radar-only transmit power values by minimizing $1_{1 \times M} p_{tx}$, subject to $q-\eta A p_{tx} \leq 0$, and setting the transmit power of the at least one dual-function radar transmitter from a selected radar-only transmit power value in the vector of radar-only transmit power values, wherein each radar-only transmit power value in the vector of radar-only transmit power values is between $p_{tx,min}$ and $p_{tx,max}$ and wherein the sum of the radar-only transmit power values in the vector of radar-only transmit power values is less than or equal to the maximum total transmit power for the system.

In one embodiment, the method further comprises switching the at least one dual-function radar transmitter to a communication-only mode, and calculating a vector of communication-only transmit power values by minimizing $$\sum_{r=1}^{R}\left|V\left[\frac{p_{tx}}{X_r}\right]-\gamma_r\right|_2$$

subject to $X_r \geq 0$ and setting the transmit power of the at least one dual-function radar transmitter from a selected communication-only transmit power value in the vector of communication-only transmit power values;
wherein each communication-only transmit power value in the vector of communication-only transmit power values is between $p_{tx,min}$ and $p_{tx,max}$ and wherein the sum of the communication-only transmit power values in the vector of communication-only transmit power values is less than or equal to the maximum total transmit power for the system. In one embodiment, the method further comprises receiving the waveform with at least one communication receiver, and comparing the received waveform to the dictionary of radar waveforms, translating the received waveform into a quantity of bits. In one embodiment, the method further comprises setting the transmit power of the at least one dual-function radar transmitter to zero when the selected transmit power value in the vector of transmit power values is below a predetermined threshold. In one embodiment, the target data comprises a plurality of target locations, each having a target localization accuracy and an estimated radar cross section.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1:
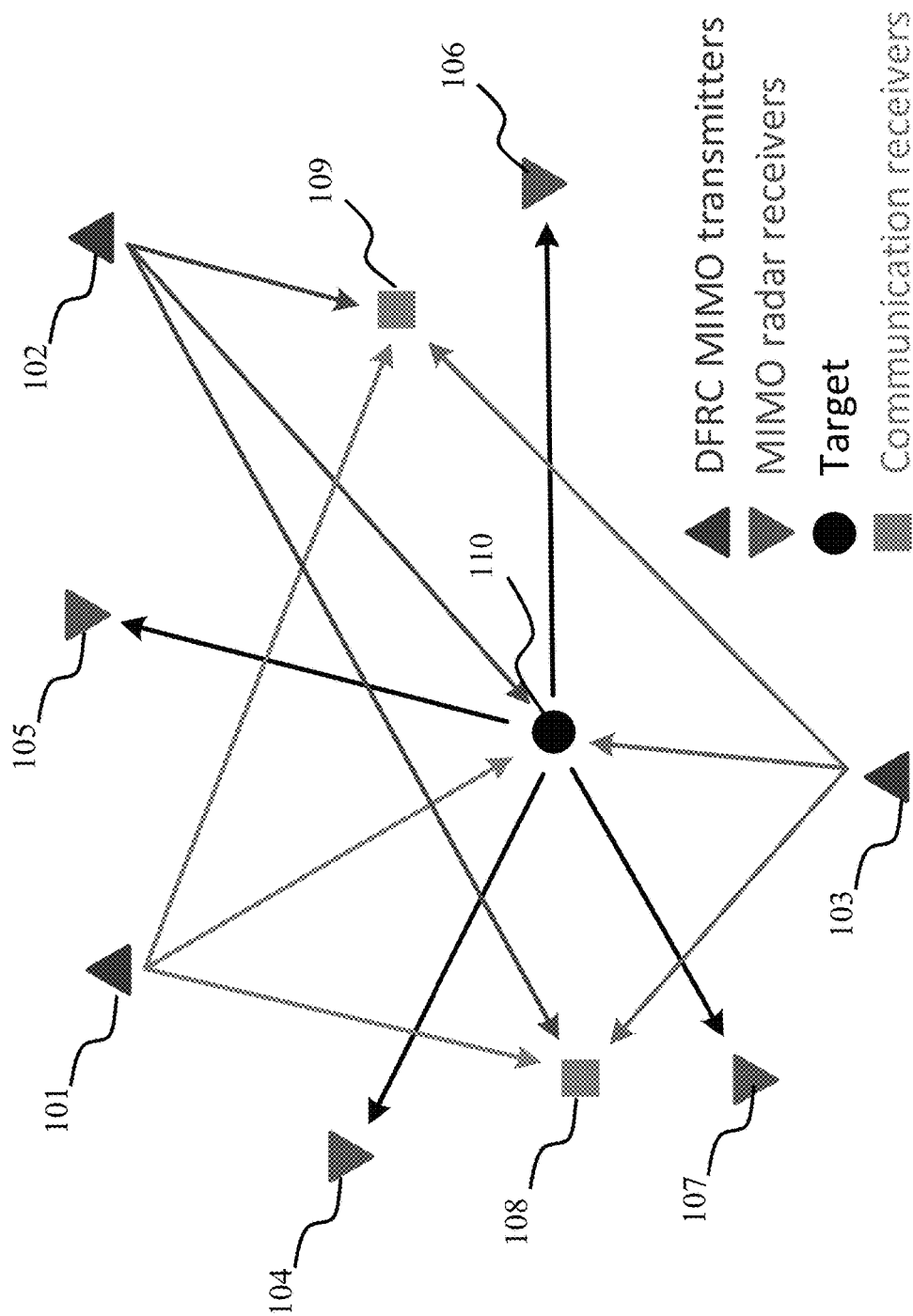
FIG. 1 is a diagram of an exemplary distributed DFRC MIMO system.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, and 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Annotations

Throughout the disclosure, lower-case and upper-case bold letters are used to represent vectors and matrices, respectively. In particular, $1_{1 \times M}$ stands for the 1×M row vector of all ones, $I_{M \times M}$ denotes the M×M identity matrix. The superscripts $(\bullet)^T$ and $(\bullet)^*$ represent the transpose and complex conjugate, respectively. $|\bullet|_2$ represents the $l_2$-norm of a vector.

Definitions

Throughout the application, the following terms are understood to have the following corresponding meanings:

CRB refers to the Cramer-Rao bound, an expression of the lower bound of a variance of an unbiased estimator.

DFRC refers to dual-function radar-communication.

MIMO as used herein refers to "Multiple Input Multiple Output."

RCS refers to the radar cross-section.

Shannon's Capacity or Shannon Capacity refers to the theoretical maximum rate at which information can be transmitted over a communications channel of a specified bandwidth in the presence of noise, as set forth by the Shannon-Hartley theorem.

In the present disclosure, a novel resource-aware DFRC strategy for distributed MIMO systems is presented. A novel power allocation scheme is disclosed for the distributed DFRC MIMO system to achieve high target localization and wireless communication performance. The localization accuracy is addressed in terms of the CRB whereas the communication performance is measured in terms of the optimal Shannon's capacity.

Although various embodiments of disclosed systems and methods may be described with the aid of particular examples, for example as a distributed radar-communication system for tracking a single target, it is understood that the systems and methods disclosed herein may be useful in any situation where distributed radar and communication systems coexist, including but not limited to distributed radar networks coexisting with wireless communication networks, drones, surveillance radars, anti-missile defense radars, underwater sonar systems, automotive radars, Internet-of-Things, or satellite networks.

System Model

A system model of the present disclosure may be thought of in terms of a radar sub-system and a communications sub-system. As contemplated herein, a radar sub-system of the invention may involve a distributed system having a plurality of transmitters, where the primary measure of success of the radar sub-system is the accurate detection, localization, and tracking of one or more targets. Target localization accuracy (referred to sometimes herein as CRB η) may in some embodiments be measured with regard to one or more thresholds. For example, in some embodiments, a value of $\eta < 10 \, m^2$ may be considered to be highly accurate, while a value of $\eta > 30 \, m^2$ may be considered insufficiently accurate. However, suitable thresholds for measuring sufficient target localization accuracy may vary based on system requirements and may include, but are not limited to, <5 m², <10 m², <100 m², <150 m², or <200 m².

In some embodiments, a radar sub-system of an architecture or system of the present disclosure may comprise a narrowband distributed MIMO radar system, a diagram of which is shown in FIG. 1. The exemplary system of FIG. 1 consists of M=3 transmitters (101, 102, 103) and N=6 receivers (radar receivers 104, 105, 106, and 107, and communication receivers 108 and 109), which are arbitrarily located in a two-dimensional (2-D) coordinate system at the locations $(x_m, y_m)$ and $(x_n, y_n)$, respectively, for $1 \le m \le M$ and $1 \le n \le N$. A single point target 110 is located at (x, y). The radar acts as a distributed DFRC MIMO system whose primary objective is to track the location of target 110. In some embodiments, a coarse estimate of the parameters related to the target's radar cross-section (RCS) and position is available, for example from previous acquisitions. During each radar pulse, each transmitter radiates an orthogonal waveform such that $(1/T) \int_0^T |s_m(t)|^2 dt = 1$ and $(1/T) \int_0^T s_m(t)s_m^*(t)dt = 0$ for $m \ne n$, where T is the duration of each pulse and t is the fast time. Additional information about exemplary system models disclosed herein may be found in A. Ahmed, Y. D. Zhang and B. Himed, "Distributed Dual-Function Radar-Communication MIMO System with Optimized Resource Allocation," 2019 *IEEE Radar Conference (RadarConf)*, Boston, Mass., USA, 2019, pp. 1-5, incorporated herein by reference in its entirety.

In some embodiments, it is desirable to have all radar transmitters and receivers operating from a single synchronized clock, or having clocks which are synchronized below a particular threshold. Clock synchronization may be accomplished for example by including a system at the radar fusion center, communicatively connected to all transmitters and receivers, and configured to synchronize the clocks of the transmitters and receivers. In other embodiments, the receivers may be preconfigured to know the transmit times of the waveforms from the transmitters, or may otherwise be periodically or continuously updated with information related to transmit times from the various transmitters.

The radar signal corresponding to the waveform transmitted by the m-th transmitter and received by the n-th receiver is expressed in equation 1 below:

$$s_{m,n}(t) = \sqrt{\alpha_{m,n} p_{m,tx}} h_{m,n} s_m(t - \tau_{m,n}) + w_{m,n}(t) \quad \text{Equation 1}$$

where $\alpha_{m,n}$ represents the signal variation due to path loss effects, $p_{m,tx}$ is the transmit power of signal $s_m(t)$ emitted from the m-th transmitter, $h_{m,n}$ denotes the target RCS for the propagation path from the m-th transmitter to the n-th receiver, and $w_{m,n}(t) \sim CN(0, \sigma_w^2)$ represents the circularly symmetric zero-mean complex white Gaussian noise. The propagation delay $\tau_{m,n}$ due to the propagation path from the m-th transmitter to the n-th receiver is given by $\tau_{m,n} = (D_{m,tx} + D_{n,rx})/c$ where $D_{m,tx}$ and $D_{n,rx}$ are the distances of the target from the m-th transmitter and that from the n-th receiver, respectively, and c is the propagation velocity of the transmitted signals. The path loss factor takes the form of $\alpha_{m,n} \propto D_{m,tx}^{-2} D_{n,rx}^{-2}$. Moreover, let $h = [h_{1,1}, h_{1,2}, \ldots h_{M,1}, h_{2,1}, \ldots, h_{M,N}]^T$ be the MN×1 vector of all bistatic RCS of the targets, and $p_{tx} = [p_{1,tx}, p_{2,tx}, \ldots p_{M,tx}]^T$ be the M×1 vector containing the transmit powers from all transmitters of the DFRC system. In addition, $p_{tx,max} = [p_{1_{tx,max}}, p_{2_{tx,max}}, \ldots, p_{M_{tx,max}}]^T$ and $p_{tx,min} = [p_{1_{tx,min}}, p_{2_{tx,min}}, \ldots, p_{M_{tx,min}}]^T$ are the M×1 vectors respectively representing the maximum and the minimum allowable transmit power from the M transmitters. $P_{total,max} \le \sum_{m=1}^{M} p_{m_{tx,max}}$ is the maximum allowable power to be transmitted from the DFRC transmitters collectively.

The radar performance can be evaluated in terms of the CRB representing the lower bound on the mean squared error of the target's location estimates, expressed as:

$$tr\{C_{x,y}\} = \frac{q^T p_{tx}}{p_{tx}^T A p_{tx}}, \quad \text{Equation 2}$$

where $q = +q_a + q_b$, $A = q_a q_b^T - q_c q_c^T$, $q_a = [q_{a_1}, q_{a_2}, \ldots, q_{a_M}]^T$, $q_b = [q_{b_1}, q_{b_2}, \ldots, q_{b_M}]^T$, $q_c = [q_{c_1}, q_{c_1}, \ldots, q_{c_M}]^T$, and tr(.) is the trace of a matrix. Here, $$q_{a_m} = \xi_m \sum_{n=1}^{N} \alpha_{m,n} |h_{m,n}|^2 \left( \frac{x_{m_{tx}} - x}{R_{m_{tx}}} + \frac{x_{n_{rx}} - x}{R_{n_{rx}}} \right)^2,$$

$$q_{b_m} = \xi_m \sum_{n=1}^{N} \alpha_{m,n} |h_{m,n}|^2 \left( \frac{y_{m_{tx}} - y}{R_{m_{tx}}} + \frac{y_{n_{rx}} - y}{R_{n_{rx}}} \right)^2,$$

$$q_{c_m} = \xi_m \sum_{n=1}^{N} \alpha_{m,n} |h_{m,n}|^2 \left( \frac{x_{m_{tx}} - x}{R_{m_{tx}}} + \frac{x_{n_{rx}} - x}{R_{n_{rx}}} \right) \left( \frac{y_{m_{tx}} - y}{R_{m_{tx}}} + \frac{y_{n_{rx}} - y}{R_{n_{rx}}} \right)$$

Equation 3 where $\xi_m = 8\pi^2 B_m / (\sigma_w^2 c^2)$ and $B_m$ is the effective bandwidth of the m-th transmitter.

In one embodiment, a communication sub-system comprises a plurality of receivers and transmitters, wherein some receivers and/or transmitters may be co-located with the transmitters of the radar sub-system as contemplated above. In some embodiments, a primary measure of success of a communication sub-system is the total system data rate, as measured for example against the Shannon's capacity.

In one exemplary embodiment, a communication sub-system includes R communication receivers located in the vicinity of a distributed DFRC MIMO system as contemplated herein. The signals reflected from the radar target and received at each communication receiver are assumed to have a significantly lower magnitude compared to the transmission from the transmitters and, thus, are ignored. Then, the received signal at the r-th ($1 \le r \le R$) communication receiver may be expressed as:

$$s_{m,r}(t) = \beta_{m,r} p_{m_{tx}} g_{m,r} s_m(t - \kappa_{m,r}) + w_{m,r}(t) \quad \text{Equation 4}$$

where $g_{m,r}$ denotes the complex channel gain, $\kappa_{m,r}$ is the propagation delay, and $\beta_{m,r} \propto D_{m,r}^{-2}$ incorporates the path loss effects, and is the distance between the m-th transmitter and the r-th communication receiver. It is assumed that $w_{m,r}(t) \sim CN(0, \sigma_{m,r})$ be circularly complex white Gaussian noise whose statistics are receiver-specific and are known at the transmitter. The channel state information, expressed as the complex channel gain vector $g = [g_{1,1}, g_{1,2}, \ldots, g_{M,1}, \ldots, g_{M,r}]^T$, is also assumed to be known at the DFRC fusion center.

The communication performance is evaluated in terms of the achieved Shannon's capacity. The data rate from the m-th transmitter to the r-th receiver is expressed in terms of Shannon's capacity as:

$$\Re_{m,r} = \log_2\left(1 + \frac{|g_{m,r}|^2 p_{m_{tx}}}{\Gamma_{m,r}\sigma_{m,r}^2}\right) = \log_2\left(1 + \frac{p_{m_{tx}}}{\gamma_{m,r}}\right) \quad \text{Equation 5}$$

where $\Gamma_{m,r} \geq 1$ represents the signal-to-noise ratio (SNR) gap which translates the loss in the data rate into the loss in the SNR and is determined by the coding scheme, and $\gamma_{m,r} = \Gamma_{r,m}\sigma_{m,r}^2/|g_{m,r}|^2$. The sum data rate per radar pulse can be calculated as $$\Re = \sum_{m=1}^{M}\sum_{r=1}^{R}\Re_{m,r}.$$

In one aspect, a system of the present disclosure relates to a power allocation architecture among a plurality of transmitters in a distributed DFRC MIMO system. In some embodiments, a power allocation architecture may comprise three different modes, among which the architecture will shift depending on certain parameters. In one embodiment, the three modes are radar-only mode, communication-only mode, and dual-function radar-communication mode. In one exemplary embodiment, one parameter used to determine the mode of operation is the presence, number, or value of radar targets within range of the distributed MIMO system. In some embodiments, parameters may include messaging priority or amount of total data necessary to be sent among the DFRC transmitters and receivers. In one exemplary embodiment, the number of targets detected within the range of a MIMO system is over a predetermined target threshold, and an expected communication data load is below a predetermined data threshold. In the exemplary embodiment, the system may transition into a radar-only mode, wherein communication needs are deprioritized in favor of a power allocation scheme configured to maximize the target localization accuracy of the one or more targets. In embodiments where one target is present, a radar-only mode power allocation for a plurality of transmitters may be obtained by the following system of equations:

minimize $1_{1 \times M} p_{tx}$ subject to $p_{tx,min} \leq p_{tx} \leq p_{tx,max}$, $\sigma_{x,y}(p_{tx}) = \eta$. \quad Equation 6

The optimization in Equation 6 minimizes the total transmit power for the distributed MIMO radar such that a desirable localization accuracy, described here in terms of the CRB $\eta$, is achieved. The optimization problem in Equation 6 can be relaxed to the following convex form in Equation 7, below:

minimize $1^{1 \times M} p_{tx}$ subject to $p_{tx,min} \leq p_{tx} \leq p_{tx,max}$, $q - \eta A p_{tx} \leq 0$. \quad Equation 7

The solution of the convex optimization problem in Equation 7 yields transmit power vector $p_{tx,opt}$, which can be used as a starting point for a local optimization applied to the original non-convex optimization in Equation 6.

The thresholds outlined above may be any suitable thresholds, and may be fixed or variable. In some embodiments, a threshold number of targets to cause a transition to a radar-only mode may be one, two, three, five, seven, ten, or any other suitable threshold. In some embodiments, an expected communication data load minimum, below which a transition to a radar-only mode may be allowed, may be no data to be transmitted, or suitable thresholds of data size, for example 1, 5, 10, 100, or 1000, bits per radar pulse, which may in some embodiments result in an overall data rate of at least 100 kbps, 500 kbps, 1 Mbps, 5 Mbps, or 10 Mbps. In other embodiments, a radar-only mode may be allowed based on the priority of the data to be transmitted. For example, one exemplary system of the invention may queue low-priority packets or messages during a radar-only mode, waiting for a high-priority packet or transmission before switching the system to a communication-only mode or a DFRC mode.

In some embodiments, a system of the invention includes a communication-only mode, as described briefly above. In a communication-only mode, it is assumed that the waveform transmitted from each transmitter is broadcast to all communication users located in the vicinity of the DFRC transmitters. It is further assumed that the channel state information is known at the DFRC transmitter and communication receivers or the DFRC fusion center. Therefore, the power allocation may be calculated by exploiting a conventional water-filling approach as known in the art. The optimal power allocation for the maximum allowable transmit power is achieved by solving the following equation simultaneously for all the communication receivers $(1 \leq r \leq R)$:

$$U\begin{bmatrix} p_{tx} \\ X_r \end{bmatrix} = \begin{bmatrix} P_{total,max} \\ \gamma_r \end{bmatrix}, \quad \text{Equation 8}$$

where $$U = \begin{bmatrix} 1_{1 \times M} & 0 \\ I_{M \times M} & -1_{1 \times M} \end{bmatrix}, \quad \gamma_r = [\gamma_{1,r}, \gamma_{2,r}, \ldots, \gamma_{R,r}]^T,$$

and $X_r$ represents the water-filling power level. Equation 8 may provide different optimal power distributions for different communication users depending on channel side information. Moreover, the solution of Equation 8 can also provide negative power if any channel has a deep fade. Therefore, we can write Equation 8 for all the communication receivers as the following constrained least-square optimization problem:

minimize $$\sum_{r=1}^{R}\left|V\begin{bmatrix} p_{tx} \\ X_r \end{bmatrix} - \gamma_r\right|_2$$

subject to $p_{tx,min} \leq p_{tx} \leq p_{tx,max}$, $1_{1 \times M} p_{tx} \leq P_{total,max}$, $X_r \geq 0, \ r = 1, 2, \ldots, R.$ \quad Equation 9 where $V = [1_{M \times M} - 1_{1 \times M}^T]$. The optimization problem described by Equation 9 is convex. However, unlike Equation 6 and Equation 7 where the least power required for satisfactory radar operation is extracted, it utilizes the maximum allowable power and distributes it with respect to channel quality for all the communication users. For a given maximum power $P_{total,max}$, the optimization problem in Equation 9 tends to maximize the water-filling level $X_r$, thus resulting in a high data rate for high-gain channels.

Data transmitted via communications transmitted by a system of the invention may be addressable (data transmitted from one transmitter may be addressed to one or more particular receivers) or broadcasted (data transmitted from one transmitter may be addressed to all receivers within range, or may not be addressed), and may use any suitable data or packet format known in the art. It is understood that a system of the invention may be configured to transmit any data which can be represented in binary form, but in various embodiments, contemplated data to be transmitted includes, but is not limited to, calculated target locations, transmit power values, fusion center messages, system acknowledgements, surveillance maps, text communication, voice communication, or the like.

In some embodiments, binary data may be transmitted using waveform diversity, as discussed briefly above. In various embodiments, a dictionary of radar waveforms may be provided to a dual-function transmitter of a system of the invention, with each waveform assigned a single-bit or multiple-bit binary value. In one exemplary embodiment, a dictionary of n waveforms could encode $\log_2(n)$ bits of data, because every combination of $\log_2(n)$ bits corresponds to a waveform in the dictionary. A long sequence of bits could therefore be translated into a shorter sequence of radar waveforms, which when transmitted and properly interpreted by one or more receivers, could be reconstituted into binary data using a reverse lookup to the same dictionary. In some embodiments, transmitted data could include error detection or error correction bits. In some embodiments, transmitted data could first be encrypted before transmission.

In some embodiments, a system of the present invention includes a DFRC mode configured to maximize communication capability while also providing sufficient target location accuracy. In some embodiments, the DFRC mode may be constrained for example by a total power envelope of the system, and/or by an individual maximum transmit power of one or more transmitters. In some embodiments, a DFRC system may include a plurality of transmitters each having different maximum transmit powers, while in other embodiments, one or more of the transmitters may have a same maximum transmit power as one or more or all of the remaining transmitters. The optimal power allocation extracted from the optimization problems in Equation 7 and Equation 9, respectively designed for radar-only and communication-only operations, are not favorable for a DFRC system where both radar target accuracy and communication data capacity should be maximized. The power allocation from Equation 7 provides a minimal required power from all the transmitters of the distributed radar. As such, this scheme may not establish an acceptable communication data capacity as most of the transmitters work on a low power in ideal radar conditions, resulting in unacceptable SNR and data rate for communication users.

Moreover, the resulting power from Equation 7 is independent of the communication channel side information. Likewise, the source allocation from Equation 9 is not suitable for radar operation as the power distribution for this case is independent of the radar performance and may result in unacceptable target tracking performance, even after the maximum allowable power is utilized. In Equation 10 below, a radar performance constraint is added to the optimization problem in Equation 9 to obtain the following modified convex optimization problem:

$$\sum_{r=1}^{R}\left|V\left[\frac{p_{tx}}{X_r}\right]-\gamma_r\right|$$

subject to $p_{tx,min} \leq p_{tx} \leq p_{tx,max}$, $q - \eta A p_{tx} \leq 0$, $1_{1 \times M} p_{tx} \leq P_{total,max}$, $X_r \geq 0, r=1,2,\ldots,R.$ \hfill Equation 10

The optimization problem in Equation 10 above provides the optimal power allocation for distributed DFRC transmitters under the maximum allowable power constraint such that the localization error for the radar operation is bounded by $\eta$. At the same time, our objective function tends to maximize the water-filling level $X_r$ to improve the communication data rate.

Information embedding in a DFRC system may be accomplished in some embodiments using waveform diversity. If each transmitter is assigned a dictionary of K radar waveforms, the total bits transmitted from the distributed DFRC MIMO system during one radar pulse is M $\log_2$ K, provided that the dictionaries are non-overlapping and all transmitters are active. The signal received at the communication receiver r can be expressed in Equation 11 below:

$$s_r(t) = \sum_{m=1}^{M} s_{m,r}(t) = \sum_{m=1}^{M} \sqrt{\beta_{m,r} p_{m_{tx}}} \, g_{m,r} s_m(t - \kappa_{m,r}) + w_r(t) \quad \text{Equation 11}$$

where $$w_r(t) = \sum_{m=1}^{M} w_{m,r}(t).$$

Matched filtering can be exploited at the communication receivers to synthesize the embedded information by feeding the time delayed versions of $s_r(t)$ in the matched filter as shown in Equation 12 below:

$$y_r(k) = \frac{1}{T}\int_0^T s_r(t - k\Delta t) s_m^*(t) dt = \quad \text{Equation 12}$$

$$\begin{cases} \sqrt{\beta_{m,r} p_{m_{tx}}} \, g_{m,r} + w_{r,k}(t), & \text{if } s_m(t) \text{ trasnmitted,} \\ w_{r,k}(t), & \text{otherwise,} \end{cases}$$

where $\Delta t$ is the time delay defining the time resolution of delay matched filtering, k is a non-negative integer with $0 \leq k \leq T/\Delta t$ and $w_{r,k}(t)$ is the noise output.

Although waveform diversity may be used, in other embodiments, one or more other information embedding schemes may be used, including but not limited to time division multiplexing, code-division multiple access, code division multiplexing, Doppler division multiplexing, frequency division multiplexing, and orthogonal frequency division multiplexing.

In various embodiments, a system of the present invention may include one or more computing devices having a non-transitory computer-readable medium with instructions stored thereon, which when executed by a processor perform steps of a method disclosed herein. A system may include a single computing device in periodic or constant communication with one or more of a plurality of dual-function radar/communication transmitters, wherein the instructions executed on the computing device adjust the individual transmit powers of one or more of the transmitters. In other embodiments, multiple, or in some embodiments every transmitter is connected to an individual computing device performing the power calculations for one, some, or all of the transmitters. Such distributed computing devices may or may not be communicatively connected to one another in a way other than the communication channel formed by the DFRC system itself.

In some embodiments, a calculated transmit power may be rounded, for example to the nearest watt, the nearest 0.1 watts, the nearest 5 watts, or any other suitable step size. In some embodiments, when a calculated transmit power of one or more DFRC transmitters is below a certain threshold, the transmit power of the one or more DFRC transmitters may be set to zero, i.e. turned off.

Figure 2:
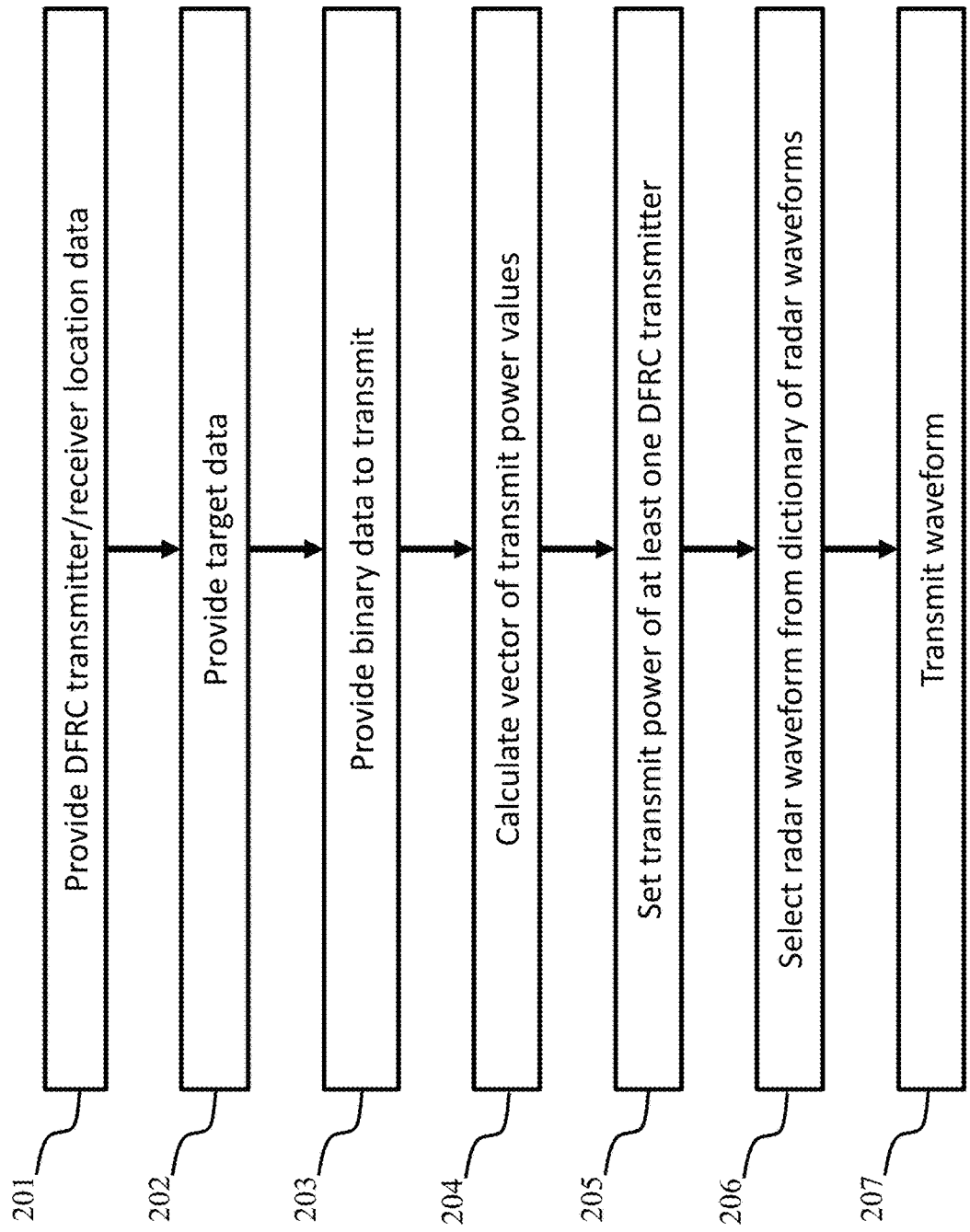
FIG. 2 is a method of the disclosure.

With reference to FIG. 2, a method of transmitting a radar waveform according to the present disclosure is shown. The method includes the steps of providing location data comprising a set of locations of a plurality of dual-function radar transmitters and a set of locations of a plurality of dual-function radar receivers in step 201, providing target data comprising a target location having a first target localization accuracy and an estimated RCS in step 202, providing a quantity of binary data for transmission and a dictionary of dual-function radar waveforms in step 203, calculating a vector of transmit power values $p_{tx}$ for the plurality of dual-function radar transmitters by minimizing $$\sum_{r=1}^{R}\left|V\left[\begin{array}{c}p_{tx}\\X_r\end{array}\right]-\gamma_r\right|,$$

subject to $p_{tx,min} \leq p_{tx} \leq P_{tx,max}$, $q - \eta AP_{tx} \leq 0$ and $X_r \geq 0$ in step 204; setting a transmit power of at least one dual-function radar transmitter from a selected transmit power value in the vector of transmit power values in step 205, selecting a radar waveform from the dictionary of radar waveforms corresponding to a subset of the binary data in step 206, and transmitting the waveform from the at least one dual-function radar transmitter at the selected transmit power value in step 207.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the system and method of the present invention. The following working examples, therefore, specifically point out the exemplary embodiments of the present invention, and are not to be construed as limiting in any way the remainder of the disclosure.

Simulation Setup

Figure 3:
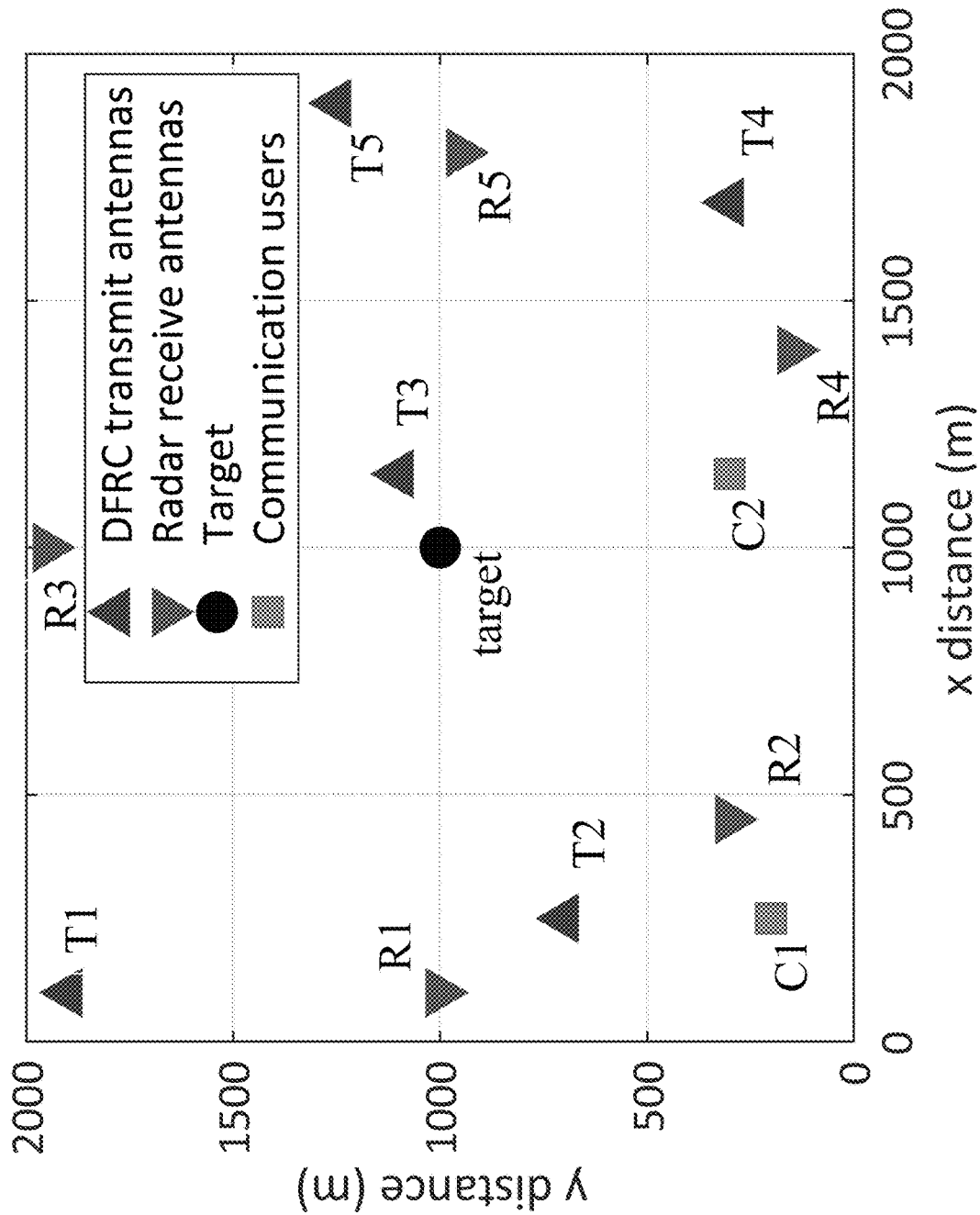
FIG. 3 is a diagram of an exemplary distributed DFRC MIMO system.

Consider a distributed DFRC MIMO system consisting of M=5 isotropic transmitters located at (100, 1900) m, (250, 700) m, (1150, 1100) m, (1700, 300) m and (1900, 1250) m, respectively, in the two-dimensional space. The radar uses N=5 receive antennas located at (100, 1000) m, (450, 300) m, (1000, 1950) m, (1400, 150) m and (1800, 950) m, respectively. A point target is located at the coordinate of (1000, 1000) m. Two communication receivers are located at (250, 200) m and (1150, 300) m, respectively. FIG. 3 shows the arrangement of the distributed DFRC MIMO system and the communication receivers in the two-dimensional coordinate system. Each transmitter can transmit a maximum of 100 W power during each radar pulse whereas the minimum allowed power for each transmitter is 1 W. Moreover, the maximum total allowable transmit power from the distributed DFRC MIMO system, $P_{total,max}$ is 400 W. The data rate for the communication system is calculated here in terms of Shannon's capacity.

The magnitude of all elements of the RCS vector his assumed to be uniformly distributed between 0.9 to 1. For this simulation, the magnitude of h was [0.962, 0.912, 0.969, 0.977, 0.907, 0.918, 0.945, 0.952, 0.982, 0.957, 0.946, 0.945, 0.952, 0.982, 0.957, 0.964, 0.941, 0.915, 0.956, 0.909, 0.906, 0.979, 0.980, 0.996, 0.902]$^T$ whereas their phases independently follow the uniform distribution between 0 and $2\pi$. The path loss coefficients $\alpha_{m,n}$ and $\beta_{m,n}$ were calculated using the location coordinates of the distributed DFRC MIMO system, the communication receivers, and the target, whereas $\xi_m = 8.773 \times 10^5$ is assumed for all $1 \leq m \leq M$. For the communication purpose, $\gamma_1 = -[1/0.8, 1/1, 1/0.01, 1/0.9, 1/0.95]^T$ and $\gamma_2 = 1/0.6, 1/0.9, 1/0.01, 1/0.85, 1/0.73]^T$.

In the disclosed experiment, both communication receivers experience deep fading with the third transmitter of the distributed DFRC MIMO system. On the other hand, the path loss coefficients $\alpha_{m,n}$ are the highest for the third transmitter of the DFRC system because of its proximity with the target. This implies that the third transmitter is the most important in determining the target localization. However, it is the least important for optimizing the data rate for the communication system due to the smallest communication SNR (deep fading) with both communication receivers.

Table 1 below summarizes the power allocation results and the radar as well as communication performance for the optimization strategies of the radar-only case illustrated above in Equation 7, the communication-only case illustrated above in Equation 9, and the DFRC case illustrated above in Equation 10. The desired radar performance is the mean squared localization error of $\eta_{desired} = 10$ m$^2$. The radar-only optimization scheme described in Equation 7 provides the optimal power required for the acceptable operation of radar. It allocates most of the transmit power to the third transmitter because it provides the best target localization accuracy due to its lowest path loss coefficient. However, the third transmitter has poor communication channel conditions, thus making it unsuitable for joint radar-communication operation because the yielding communication sum data rate is only 8.87 bits/pulse.

TABLE 1

|  | Radar-only | Communication-only | DFRC |
|---|---|---|---|
| Power, $p_{tx}$ (W) | $\begin{bmatrix} 1.0 \\ 1.0 \\ 90.46 \\ 1.0 \\ 1.0 \end{bmatrix}$ | $\begin{bmatrix} 99.45 \\ 99.95 \\ 1.02 \\ 99.86 \\ 99.72 \end{bmatrix}$ | $\begin{bmatrix} 89.39 \\ 81.27 \\ 72.22 \\ 79.43 \\ 77.69 \end{bmatrix}$ |
| $P_{total}$ (W) | 94.46 | 400 | 400 |
| η (m²) | 9.97 | 30.59 | 8.21 |
| ℜ (bits/pulse) | 8.87 | 51.16 | 50.44 |

Table 1 above shows the power allocation for a radar-only, communication-only, and DFRC modes of the disclosed system. The data is calculated from the scenario of FIG. 2, with M=N=5, and r=2, $P_{total,max}$=400 W, and $\eta_{desired}$=10 m².

The communication-only scheme in Equation 9 exploits water-filling under the available power constraint to achieve the optimal sum data rate of 51.16 bits/pulse. It can be observed that the least power is allocated to the third transmitter due to its worst communication conditions and more power is allocated to other transmitters with better communication channel conditions. Although this scheme is the best to achieve the optimal data rate, it results in a high CRB of η=30.59 m² while using 400 W power, thus failing to achieve the desired radar performance, even consuming the maximum allowable total power.

The distributed DFRC MIMO scheme described in Equation 10 allocates the optimal power to different transmitters by simultaneously considering the communication and radar objectives. As the radar objective is the primary one, it is observed that the DFRC scheme allocates a considerable amount of power to the third transmitter, resulting in the desired target localization accuracy with η=8.21 m², whereas the secondary communication operation achieves a sum data rate of 50.44 bits/pulse. The results clearly confirm the promising performance of the disclosed architecture.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

REFERENCES

The following publications are incorporated herein by reference in their entireties:

H. Griffiths, S. Blunt, L. Cohen, and L. Savy, "Challenge problems in spectrum engineering and waveform diversity," in Proc. IEEE Radar Conf., Ottawa, Canada, April-May 2013, pp. 1-5.

C. Baylis, M. Fellows, L. Cohen, and R. J. Marks, "Solving the spectrum crisis: Intelligent, reconfigurable microwave transmitter amplifiers for cognitive radar," IEEE Microw. Mag., vol. 15, no. 5, pp. 94-107, July-August 2014.

H. T. Hayvaci and B. Tavli, "Spectrum sharing in radar and wireless communication systems: A review," in Proc. Int. Conf. Electromagn. in Advanced Appl., Palm Beach, Aruba, August 2014, pp. 810-813.

H. Griffiths, L. Cohen, S. Watts, E. Mokole, C. Baker, M. Wicks, and S. Blunt, "Radar spectrum engineering and management: Technical and regulatory issues," Proc. IEEE, vol. 103, no. 1, pp. 85-102, January 2015.

S. Kumar, G. Costa, S. Kant, B. F. Flemming, N. Marchetti, and P. Mogensen, "Spectrum sharing for next generation wireless communication networks," in Proc. Int. Workshop on Cognitive Radio and Advanced Spectr. Manag., Aalborg, Denmark, February 2008, pp. 1-5.

E. Biglieri, Principles of Cognitive Radio, Cambridge University Press, 2012.

C. Sturm, T. Zwick, and W. Wiesbeck, "An OFDM system concept for joint radar and communications operations," in Proc. IEEE Veh. Technol. Conf., Barcelona, Spain, April 2009, pp. 1-5.

D. W. Bliss, "Cooperative radar and communications signaling: The estimation and information theory odd couple," in Proc. IEEE Radar Conf., Cincinnati, Ohio, May 2014, pp. 50-55.

F. Paisana, N. Marchetti, and L. A. DaSilva, "Radar, TV and cellular bands: Which spectrum access techniques for which bands?" Commun. Surveys & Tuts., vol. 16, no. 3, pp. 1193-1220, 2014.

Z. Geng, H. Deng, and B. Himed, "Adaptive radar beamforming for interference mitigation in radar-wireless spectrum sharing," IEEE Signal Process. Lett., vol. 22, no. 4, pp. 484-488, April 2015.

K.-W. Huang, M. Bica, U. Mitra, and V. Koivunen, "Radar waveform design in spectrum sharing environment: Coexistence and cognition," in Proc. IEEE Radar Conf., Johannesburg, South Africa, May 2015, pp. 1698-1703.

S. D. Blunt, M. R. Cook, and J. Stiles, "Embedding information into radar emissions via waveform implementation," in Proc. Int. Waveform Diversity and Design Conf., Niagara Falls, Canada, August 2010, pp. 195-199.

J. Euziere, R. Guinvarc'h, M. Lesturgie, B. Uguen, and R. Gillard, "Dual function radar communication time-modulated array," in Proc. Int. Radar Conf., Cincinnati, Ohio, October 2014, pp. 1-4.

A. Hassanien, M. G. Amin, Y. D. Zhang, and F. Ahmad, "Dual-function radar-communications using phase-rotational invariance," in Proc. European Signal Process. Conf., August 2015, pp. 1346-1350.

A. Hassanien, M. G. Amin, Y. D. Zhang, and F. Ahmad, "Dual-function radar-communications: Information embedding using sidelobe control and waveform diversity," IEEE Trans. Signal Process., vol. 64, no. 8, pp. 2168-2181, April 2016.

A. Hassanien, M. G. Amin, Y. D. Zhang, and F. Ahmad, "Phase-modulation based dual-function radar-communications," IET Radar Sonar Navig., vol. 10, no. 8, pp. 1411-1421, 2016.

A. Hassanien, M. G. Amin, Y. D. Zhang, F. Ahmad, and B. Himed, "Non-coherent PSK-based dual-function radar-communication systems," in Proc. IEEE Radar Conf., Philadelphia, Pa., May 2016, pp. 1-6.

A. Hassanien, M. G. Amin, Y. D. Zhang, and F. Ahmad, "Signaling strategies for dual-function radar communications: An overview," IEEE Aerosp. Electron. Syst. Mag., vol. 31, no. 10, pp. 36-45, October 2016.

A. Ahmed, Y. D. Zhang, and B. Himed, "Multi-user dual-function radar-communications exploiting sidelobe control and waveform diversity," in Proc. IEEE Radar Conf., Oklahoma City, Okla., April 2018, pp. 698-702.

A. Ahmed, Y. Gu, D. Silage, and Y. D. Zhang, "Power-efficient multi-user dual-function radar-communications," in Proc. IEEE Int. Workshop on Signal Process. Advances in Wireless Commun., Kalamata, Greece, June 2018.

F. Liu, L. Zhou, C. Masouros, A. Li, W. Luo, and A. Petropulu, "Toward dual-functional radar-communication systems: Optimal waveform design," IEEE Trans. Signal Process., vol. 66, no. 16, pp. 4264-4279, August 2018.

A. Ahmed, Y. D. Zhang, and Y. Gu, "Dual-function radar-communications using QAM-based sidelobe modulation," Digital Signal Process., vol. 82, pp. 166-174, November 2018.

A. M. Haimovich, R. S. Blum, and L. J. Cimini, "MIMO radar with widely separated antennas," IEEE Signal Process. Mag., vol. 25, no. 1, pp. 116-129, 2008.

H. Godrich, A. M. Haimovich, and R. S. Blum, "Target localization accuracy gain in MIMO radar-based systems," IEEE Trans. Inf. Theory, vol. 56, no. 6, pp. 2783-2803, June 2010.

H. Godrich, A. P. Petropulu, and H. V. Poor, "Power allocation strategies for target localization in distributed multiple-radar architectures," IEEE Trans. Signal Process., vol. 59, no. 7, pp. 3226-3240, July 2011.

H. Godrich, A. P. Petropulu, and H. V. Poor, "Sensor selection in distributed multiple-radar architectures for localization: A knapsack problem formulation," IEEE Trans. Signal Process., vol. 60, no. 1, pp. 247-260, January 2012.

A. Goldsmith, Wireless Communications, Cambridge University Press, 2005.

What is claimed is:

1. A system for distributed dual-function radar-communication, comprising:
   a plurality of M dual-function radar transmitters positioned within a region of interest, each configured to transmit at least one radar waveform, with each m-th transmitter for m=1,...,M having a minimum transmit power $p_{m_{tx,min}}$, a maximum transmit power $p_{m_{tx,max}}$, and a working transmit power $p_{m_{tx}}$;
   a plurality of radar receivers positioned within the region of interest, each configured to receive the radar waveforms;
   at least one controller communicatively connected to at least one connected transmitter of the plurality of dual-function radar transmitters, comprising a non-transitory computer-readable medium with instructions stored thereon, which when executed by a processor perform steps comprising:
      accepting a vector of locations of the plurality of dual-function radar transmitters and a vector of locations of the radar receivers;
      accepting target data comprising a target location having a first target localization accuracy and an estimated radar cross section;
      calculating a vector of transmit power values $p_{tx}$ for the plurality of dual-function radar transmitters by minimizing $$\sum_{r=1}^{R} \left| V\left[\frac{p_{tx}}{X_r}\right] - \gamma_r \right|,$$

subject to q−ηAp$_{tx}$≤0 and X$_r$≥0;
      receiving the waveform with at least one dual-function radar receiver of the plurality of radar receivers;
      calculating, from the received waveform, an updated target location having a second target localization accuracy;
      providing the updated target location and second target localization accuracy to the at least one dual-function radar transmitter;
      recalculating the vector of transmit power values; and
      setting a transmit power of the at least one dual-function radar transmitter from a selected transmit power value in the updated vector of transmit power values;
   wherein each transmit power value in the vector of transmit power values is between $p_{m_{tx,min}}$ and $p_{m_{tx,max}}$ and wherein the sum of the transmit power values in the vector of transmit power values is less than or equal to a maximum total transmit power for the system;
   wherein $X_r$ is the water-filling power level;
   wherein $\gamma_r = [\gamma_{1,r}, \gamma_{2,r}, \ldots, \gamma_{R,r}]^T$ and $\Gamma_{m,r} = \gamma_{m,r} = \gamma_{m,r} \sigma_{m,r}^2 / |g_{m,r}|^2$;
   wherein $q = q_a + q_b$, $A = q_a q_b^T - q_c q_c^T$, $q_a = [q_{a_1}, q_{a_2}, \ldots, q_{a_M}]^T$, $q_b = [q_{b_1}, q_{b_2}, \ldots, q_{b_M}]^T$, $q_c = [q_{c_1}, q_{c_2}, \ldots, q_{c_M}]^T$;
   wherein η is the Cramer-Rao bound of the desired target localization accuracy; and
   wherein T is the pulse duration.

2. The system of claim 1, wherein the at least one controller is communicatively connected to all of the dual-function radar transmitters.

3. The system of claim 1, wherein the steps further comprise receiving an updated target location having a second target localization accuracy, and recalculating the vector of transmit powers.

4. The system of claim 1, wherein the steps further comprise:
   when the target location is outside the region of interest, switching the system into a communication-only mode; and
   when the target location is inside the region of interest, switching the system into a dual-function radar-communication mode.

5. The system of claim 1, further comprising a time synchronization system communicatively connected to the dual-function radar transmitters and radar receivers, configured to synchronize clocks of the dual-function radar transmitters and radar receivers.

6. The system of claim 1, wherein the steps further comprise:
   accepting a quantity of data to be transmitted;
   translating the quantity of data into a sequence of radar waveforms from a dictionary of radar waveforms; and
   providing the sequence of radar waveforms to the at least one connected dual-function radar transmitter.

7. The system of claim 6, the steps further comprising encrypting the binary data.

8. The system of claim 6, the steps further comprising adding error correction bits to the binary data.

9. The system of claim 1, further comprising a plurality of communication receivers.

10. The system of claim 1, wherein the target data comprises a plurality of target locations, each having a target localization accuracy and an estimated radar cross section.

11. A method of transmitting a radar waveform, comprising:
   providing location data comprising a set of locations of a plurality of dual-function radar transmitters and a set of locations of a plurality of radar receivers;
   providing target data comprising a target location having a first target localization accuracy and an estimated radar cross section;

providing a quantity of data for transmission and a dictionary of radar waveforms;

calculating a vector of transmit power values $p_{tx}$ for the plurality of dual-function radar transmitters by minimizing $$\sum_{r=1}^{R}\left|V\begin{bmatrix}p_{tx}\\X_r\end{bmatrix}-\gamma_r\right|,$$

subject to $q-\eta A p_{tx} \leq 0$ and $X_r \geq 0$;

setting a transmit power of at least one dual-function radar transmitter from a selected transmit power value in the vector of transmit power values;

selecting a radar waveform from the dictionary of radar waveforms corresponding to a subset of the binary data;

transmitting the waveform from the at least one dual-function radar transmitter at the selected transmit power value;

receiving the waveform with at least one dual-function radar receiver of the plurality of radar receivers;

calculating, from the received waveform, an updated target location having a second target localization accuracy;

providing the updated target location and second target localization accuracy to the at least one dual-function radar transmitter;

recalculating the vector of transmit power values; and setting a transmit power of the at least one dual-function radar transmitter from a selected transmit power value in the updated vector of transmit power values;

wherein each transmit power value in the vector of transmit power values is between $p_{tx,min}$ and $p_{tx,max}$ and wherein the sum of the transmit power values in the vector of transmit power values is less than or equal to a maximum total transmit power for the system;

wherein $X_r$ is the water-filling power level;

wherein $\gamma_r = [\gamma_{1,r}, \gamma_{2,r}, \ldots, \gamma_{R,r}]^T$ and $\Gamma_{m,r} = \gamma_{m,r} = \gamma_{m,r} \sigma_{m,r}^2 / |g_{m,r}|^2$;

wherein $q = q_a + q_b$, $A = q_a q_b^T - q_c q_c^T$, $q_a = [q_{a_1}, q_{a_2}, \ldots, q_{a_M}]^T$, $q_b = [q_{b_1}, q_{b_2}, \ldots, q_{b_M}]^T$, $q_c = [q_{c_1}, q_{c_2}, \ldots, q_{c_M}]^T$;

wherein $\eta$ is the Cramer-Rao bound of the desired target localization accuracy; and wherein T is the pulse duration.

12. The method of claim 11, comprising setting a transmit power of the plurality of dual-function radar transmitters from the transmit power values in the vector of transmit power values.

13. The method of claim 11, further comprising selecting a second radar waveform from the dictionary of radar waveforms corresponding to an adjacent subset of the binary data; and transmitting the second radar waveform from the at least one dual-function radar transmitter at the selected power value.

14. The method of claim 11, wherein the second target localization accuracy is more accurate than the first target localization accuracy.

15. The method of claim 11, further comprising:

switching the at least one dual-function radar transmitter to a radar-only mode; and calculating a vector of radar-only transmit power values by minimizing $1_{1 \times M} p_{tx}$, subject to $q - \eta A p_{tx} \leq 0$; and setting the transmit power of the at least one dual-function radar transmitter from a selected radar-only transmit power value in the vector of radar-only transmit power values;

wherein each radar-only transmit power value in the vector of radar-only transmit power values is between $p_{tx,min}$ and $p_{tx,max}$ and wherein the sum of the radar-only transmit power values in the vector of radar-only transmit power values is less than or equal to the maximum total transmit power for the system.

16. The method of claim 11, further comprising:

switching the at least one dual-function radar transmitter to a communication-only mode;

calculating a vector of communication-only transmit power values by minimizing $$\sum_{r=1}^{R}\left|V\begin{bmatrix}p_{tx}\\X_r\end{bmatrix}-\gamma_r\right|_2$$

subject to $X_r \geq 0$; and setting the transmit power of the at least one dual-function radar transmitter from a selected communication-only transmit power value in the vector of communication-only transmit power values;

wherein each communication-only transmit power value in the vector of communication-only transmit power values is between $p_{tx,min}$ and $n\, p_{tx,max}$ and wherein the sum of the communication-only transmit power values in the vector of communication-only transmit power values is less than or equal to the maximum total transmit power for the system.

17. The method of claim 11, further comprising receiving the waveform with at least one communication receiver; and comparing the received waveform to the dictionary of radar waveforms, translating the received waveform into a quantity of bits.

18. The method of claim 11, comprising setting the transmit power of the at least one dual-function radar transmitter to zero when the selected transmit power value in the vector of transmit power values is below a predetermined threshold.

19. The method of claim 11, wherein the target data comprises a plurality of target locations, each having a target localization accuracy and an estimated radar cross section.

* * * * *